US009331346B2

(12) United States Patent
Tanaka et al.

(10) Patent No.: US 9,331,346 B2
(45) Date of Patent: May 3, 2016

(54) FUEL CELL RESIN FRAME EQUIPPED MEMBRANE ELECTRODE ASSEMBLY

(71) Applicant: HONDA MOTOR CO., LTD., Minato-Ku, Tokyo (JP)

(72) Inventors: Yukihito Tanaka, Saitama (JP); Naoki Mitsuta, Nasukarasuyama (JP); Masashi Sugishita, Utsunomiya (JP)

(73) Assignee: Honda Motor Co., Ltd., Tokyo (JP)

(*) Notice: Subject to any disclaimer, the term of this patent is extended or adjusted under 35 U.S.C. 154(b) by 102 days.

(21) Appl. No.: 13/737,001

(22) Filed: Jan. 9, 2013

(65) Prior Publication Data

US 2013/0183604 A1 Jul. 18, 2013

(30) Foreign Application Priority Data

Jan. 16, 2012 (JP) .................................. 2012-006261
Aug. 1, 2012 (JP) .................................. 2012-170996

(51) Int. Cl.
*H01M 8/02* (2006.01)
*H01M 8/10* (2006.01)

(52) U.S. Cl.
CPC .......... *H01M 8/0289* (2013.01); *H01M 8/0273* (2013.01); *H01M 2008/1095* (2013.01); *Y02E 60/50* (2013.01)

(58) Field of Classification Search
CPC ....................................................... H01M 8/02
See application file for complete search history.

(56) References Cited

U.S. PATENT DOCUMENTS

| 2002/0197519 | A1* | 12/2002 | Einhart et al. ................... 429/32 |
| 2005/0014056 | A1* | 1/2005 | Zuber et al. ..................... 429/34 |
| 2005/0181267 | A1* | 8/2005 | Mitsuta ............... H01M 8/0284 429/483 |
| 2011/0136038 | A1* | 6/2011 | Ishida ................. H01M 8/0273 429/480 |

FOREIGN PATENT DOCUMENTS

| JP | H09-199145 A | 7/1997 |
| JP | 2007-066766 A | 3/2007 |
| JP | 2009-514144 A | 4/2009 |

OTHER PUBLICATIONS

Japanese Office Action dated Feb. 12, 2014 issued over the corresponding Japanese Patent Application No. 2012-170996 with the English translation of pertinent portion.

* cited by examiner

*Primary Examiner* — Edu E Enin-Okut
*Assistant Examiner* — Seenam Agbetiafan
(74) *Attorney, Agent, or Firm* — Carrier Blackman & Associates, P.C.; Joseph P. Carrier; William D. Blackman

(57) ABSTRACT

A resin frame equipped membrane electrode assembly includes a membrane electrode assembly and a resin frame member. The membrane electrode assembly includes an anode, a cathode, and a solid polymer electrolyte membrane interposed between the anode and the cathode. The resin frame member is provided around the solid polymer electrolyte membrane. The resin frame member includes an inner extension protruding toward the outer periphery of the cathode to contact the outer end of the solid polymer electrolyte membrane. The inner extension of the resin frame member includes a plurality of columnar projections formed integrally with an adhesive surface where an adhesive layer is provided.

5 Claims, 13 Drawing Sheets

PRIOR ART

FUEL CELL RESIN FRAME EQUIPPED MEMBRANE ELECTRODE ASSEMBLY

CROSS-REFERENCE TO RELATED APPLICATIONS

This application is based upon and claims the benefit of priority from Japanese Patent Applications No. 2012-006261 filed on Jan. 16, 2012 and No. 2012-170996 filed on Aug. 1, 2012, the contents all of which are incorporated herein by reference.

BACKGROUND OF THE INVENTION

1. Field of the Invention

The present invention relates to a fuel cell resin frame equipped membrane electrode assembly including a membrane assembly and a resin frame member. The membrane electrode assembly includes an anode, a cathode, and a solid polymer electrolyte membrane interposed between the anode and the cathode. The resin frame member is provided around the solid polymer electrolyte membrane.

2. Description of the Related Art

In general, a solid polymer electrolyte fuel cell employs a solid polymer electrolyte membrane. The solid polymer electrolyte membrane is a polymer ion exchange membrane. In the fuel cell, the solid polymer electrolyte membrane is interposed between an anode and a cathode to form a membrane electrode assembly (MEA). Each of the anode and the cathode includes electrode catalyst as an electrode catalyst layer and porous carbon as a gas diffusion layer. The membrane electrode assembly is sandwiched between separators (bipolar plates) to form a fuel cell. In use of the fuel cell, generally, a predetermined number of power generation cells are stacked together to form a fuel cell stack, e.g., mounted in a vehicle.

In some cases, in the membrane electrode assembly, the surface size of one of gas diffusion layers is smaller than the surface size of the solid polymer electrolyte membrane, and the surface size of the other gas diffusion layer is the same as the surface size of the solid polymer electrolyte membrane, e.g., as a stepped-type MEA. In such cases, frame equipped MEAs, i.e., MEAs equipped with resin frame members are adopted for reducing the amount of relatively expensive material used for the solid polymer electrolyte membrane and protecting the solid polymer electrolyte member in a form of a thin film having low strength.

For example, a membrane electrode assembly disclosed in Japanese Laid-Open Patent Publication No. 2009-514144 (PCT) (hereinafter referred to as conventional technique) is known. In the membrane electrode assembly, as shown in FIG. 13, on one surface of an ion exchange membrane 1, a catalyst layer 2a and a gas diffusion layer 3a having a surface size smaller than that of the ion exchange membrane 1 are provided.

A surface 1a which is not supported by the gas diffusion layer 3a is included in the one surface of the ion exchanger membrane 1. A catalyst layer 2b and a gas diffusion layer 3b are provided over the entire other surface of the ion exchange membrane 1. The ion exchanger membrane 1 has a seal member 4 for sealing the edge and the surface 1a of the gas diffusion layers 3a, 3b.

SUMMARY OF THE INVENTION

In the conventional technique, at the time of joining the seal member 4 to the ion exchange membrane 1, normally, the surface 1a of the ion exchange membrane 1 and an inner surface 4a of the seal member 4 are joined together using adhesive 5.

However, the portion where the surface 1a of the ion exchange membrane 1 and the inner surface 4a of the seal member 4 are joined together is present in a relatively small area. In the structure, the surface 1a and the inner surface 4a are not firmly adhered together by the adhesive 5.

The present invention has been made to solve the problem of this type, and an object of the present invention is to provide a fuel cell resin frame equipped membrane electrode assembly in which a resin frame member can be adhered to a solid polymer electrolyte membrane of a membrane electrode assembly (stepped-type MEA) firmly and easily around the outer end of the solid polymer electrolyte membrane.

The present invention relates to a fuel cell resin frame equipped membrane electrode assembly including a membrane electrode assembly and a resin frame member. The membrane electrode assembly includes a solid polymer electrolyte membrane, a first electrode provided on one surface of the solid polymer electrolyte membrane, and a second electrode provided on another surface of the solid polymer electrolyte membrane. The first electrode includes a first catalyst layer and a first diffusion layer. The second electrode includes a second catalyst layer and a second diffusion layer. The first electrode has a surface size larger than that of the second electrode. The resin frame member is provided around the solid polymer electrolyte membrane.

In the fuel cell resin frame equipped membrane electrode assembly, the resin frame member includes an inner extension protruding toward an outer periphery of the second electrode, and adhered to an outer end of the solid polymer electrolyte membrane. Uneven portions are provided in an adhesive surface of the inner extension.

Further, in the fuel cell resin frame equipped membrane electrode assembly, the resin frame member includes an inner extension protruding toward an outer periphery of the second electrode, and adhered to an outer end of the solid polymer electrolyte membrane. Uneven portions having a 10-point average roughness Rz in a range of 1.6 μm to 50 μm are randomly provided in an adhesive surface of the inner extension.

In the present invention, the inner extension of the resin frame member includes uneven portions in an adhesive surface adhered to the outer end of the solid polymer electrolyte membrane. In the structure, the inner extension of the resin frame member can be adhered to the outer end of the solid polymer electrolyte membrane firmly and easily, and the desired strength of joining components of the entire resin frame equipped membrane electrode assembly is reliably maintained.

Further, in the present invention, uneven portions having a 10-point average roughness Rz in a range of 1.6 μm to 50 μm are randomly provided in an adhesive surface of the inner extension. Thus, it becomes possible to reliably maintain the strength of joining components of the entire resin frame equipped membrane electrode assembly reliably.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
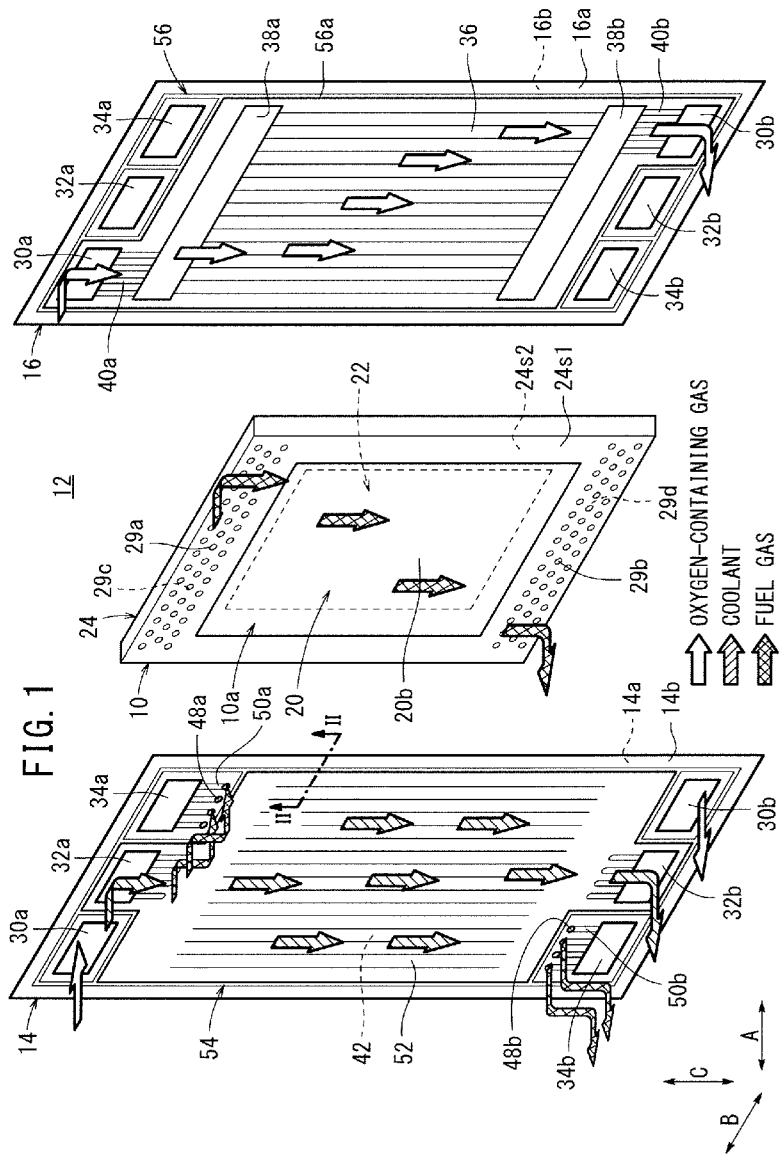
FIG. 1 is an exploded perspective view showing main components of a solid polymer electrolyte fuel cell including a resin frame equipped membrane electrode assembly according to a first embodiment of the present invention.
Figure 2:
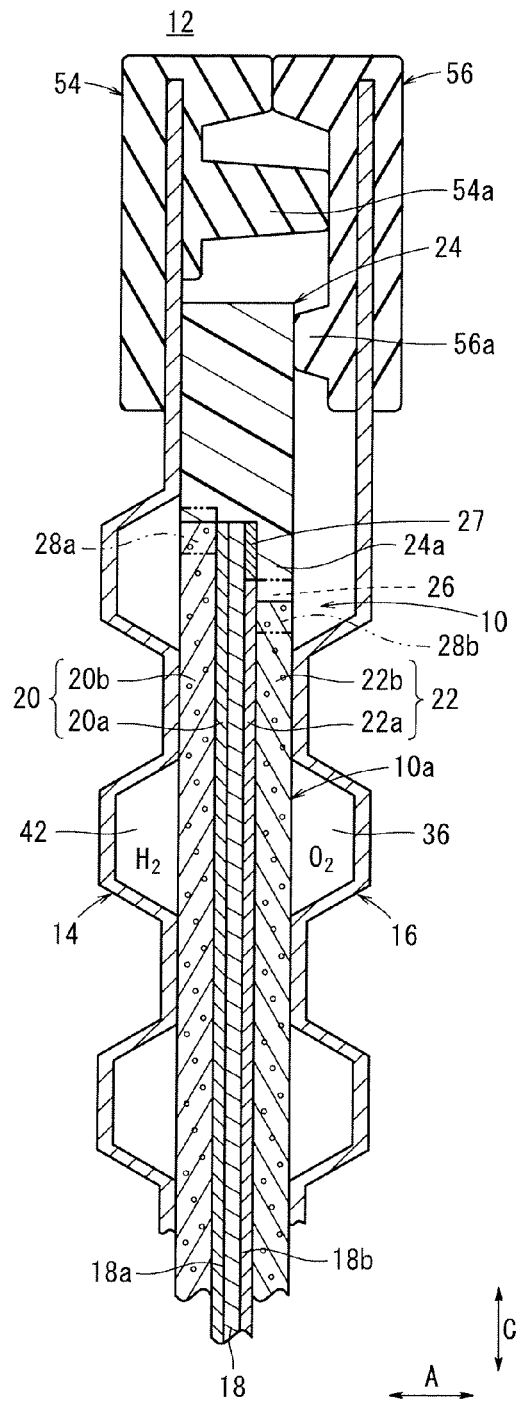
FIG. 2 is a cross sectional view showing the fuel cell, taken along a line II-II in FIG. 1.

As shown in FIGS. 1 and 2, a resin frame equipped membrane electrode assembly 10 according to a first embodiment of the present invention is included in a rectangular solid polymer electrolyte fuel cell 12, and a plurality of the fuel cells 12 are stacked together in a direction indicated by an arrow A to form a fuel cell stack. For example, the fuel cell stack is mounted in a fuel cell electric vehicle.

In the fuel cell 12, the resin frame equipped membrane electrode assembly 10 is sandwiched between a first separator 14 and a second separator 16. Each of the first separator 14 and the second separator 16 has a rectangular shape elongated in a longitudinal direction. For example, the first separator 14 and the second separator 16 are made of metal plates such as steel plates, stainless steel plates, aluminum plates, plated steel sheets, or metal plates having anti-corrosive surfaces by surface treatment. Alternatively, carbon members may be used as the first separator 14 and the second separator 16.

Figure 3:
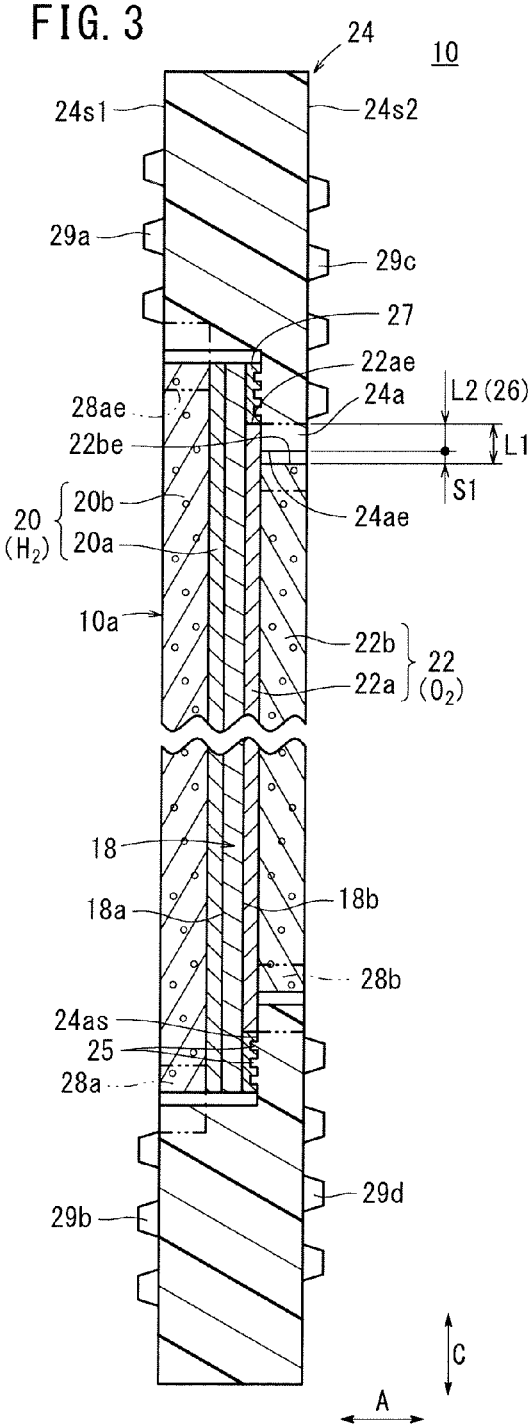
FIG. 3 is a cross sectional view showing main components of the resin frame equipped membrane electrode assembly.

As shown in FIGS. 2 and 3, the resin frame equipped rectangular membrane electrode assembly 10 includes a membrane electrode assembly 10a. Each membrane electrode assembly 10a includes an anode (first electrode) 20, and a cathode (second electrode) 22, and a solid polymer electrolyte membrane 18 interposed between the anode 20 and the cathode 22. For example, the solid polymer electrolyte membrane 18 is formed by impregnating a thin membrane of perfluorosulfonic acid with water. A fluorine based electrolyte may be used as the solid polymer electrolyte membrane 18. Alternatively, an HC (hydrocarbon) based electrolyte may be used as the solid polymer electrolyte membrane 18. The surface size (flat dimension) of the cathode 22 is smaller than the surface size (flat dimension) of the solid polymer electrolyte membrane 18 and the surface size (flat dimension) of the anode 20.

Instead of the above structure, the surface size of the anode 20 may be smaller than the surface sizes of the solid polymer electrolyte membrane 18 and the cathode 22. In this case, the anode 20 is a second electrode, and the cathode 22 is a first electrode.

The anode 20 includes an electrode catalyst layer (first catalyst layer) 20a joined to one surface 18a of the solid polymer electrolyte membrane 18 and a gas diffusion layer (first diffusion layer) 20b stacked on the electrode catalyst layer 20a. The outer shape of the electrode catalyst layer 20a and the outer shape of the gas diffusion layer 20b have the same size. The outer shape of the electrode catalyst layer 20a and the outer shape of the gas diffusion layer 20b are the same as (or smaller than) the outer shape of the solid polymer electrolyte membrane 18.

The cathode 22 includes an electrode catalyst layer (second catalyst layer) 22a joined to a surface 18b of the solid polymer electrolyte membrane 18, and a gas diffusion layer (second diffusion layer) 22b stacked on the electrode catalyst layer 22a. As shown in FIG. 3, an outer end 22ae of the electrode catalyst layer 22a protrudes outward (in the direction indicated by the arrow C) beyond an outer end 22be of the gas diffusion layer 22b over the periphery by the length L1. The outer shape of the electrode catalyst layer 22a is smaller than the outer shape of the solid polymer electrolyte membrane 18.

Each of the electrode catalyst layers 20a, 22a is formed by carbon black supporting platinum particles as catalyst particles. As an ion conductive binder, polymer electrolyte is used. Catalyst paste formed by mixing the catalyst particles uniformly in the solution of this polymer electrolyte is printed, applied, or transferred on both surfaces of the solid polymer electrolyte membrane 18 to form the electrode catalyst layers 20a, 22a. For example, each of the gas diffusion layers 20b, 22b comprises a carbon paper. The surface size of the gas diffusion layer 22b is smaller than the surface size of the gas diffusion layer 20b.

As shown in FIGS. 1 to 4, the resin frame equipped membrane electrode assembly 10 is formed around the outer end of the solid polymer electrolyte membrane 18, and includes a resin frame member 24 joined to the anode 20 and the cathode 22. For example, the resin frame member 24 is made of PPS (poly phenylene sulfide resin), PPA (polyphthalamide), PEN (polyethylene naphthalate), PES (polyethersulfone), LCP (liquid crystal polymer), PVDF (polyvinylidene fluoride), a silicone rubber, a fluororubber, or an EPDM (ethylene propylene diene monomer) rubber.

The resin frame member 24 has an inner extension 24a protruding toward the outer periphery of the cathode 22 to contact the outer end of the solid polymer electrolyte membrane 18. The inner extension 24a is thinner than the outer portion of the resin frame member 24, and has the same thickness as the cathode 22. In effect, the inner extension 24a has the same thickness as the gas diffusion layer 22b (including the thickness of an intermediate layer if such an intermediate layer is provided on the gas diffusion layer 22b). A gap S1 is formed between an inner end 24ae of the inner extension 24a and the outer end 22be of the gas diffusion layer 22b (see FIG. 3).

The inner extension 24a of the resin frame member 24 includes an overlapped portion 26 overlapped with the outer end of the electrode catalyst layer 22a in the stacking direction indicated by the arrow A. In the overlapped portion 26, the outer end 22ae of the electrode catalyst layer 22a and the inner end 24ae of the inner extension 24a are overlapped over the length L2.

The inner extension 24a of the resin frame member 24 is adhered to the outer end of the solid polymer electrolyte membrane 18 and the outer end of the electrode catalyst layer 22a by an adhesive layer 27. The adhesive layer 27 is formed in a frame shape over the entire periphery of the outer end of the solid polymer electrolyte membrane 18. For example, ester based or urethane based hot melt adhesive is used for the adhesive layer 27.

Figure 4:
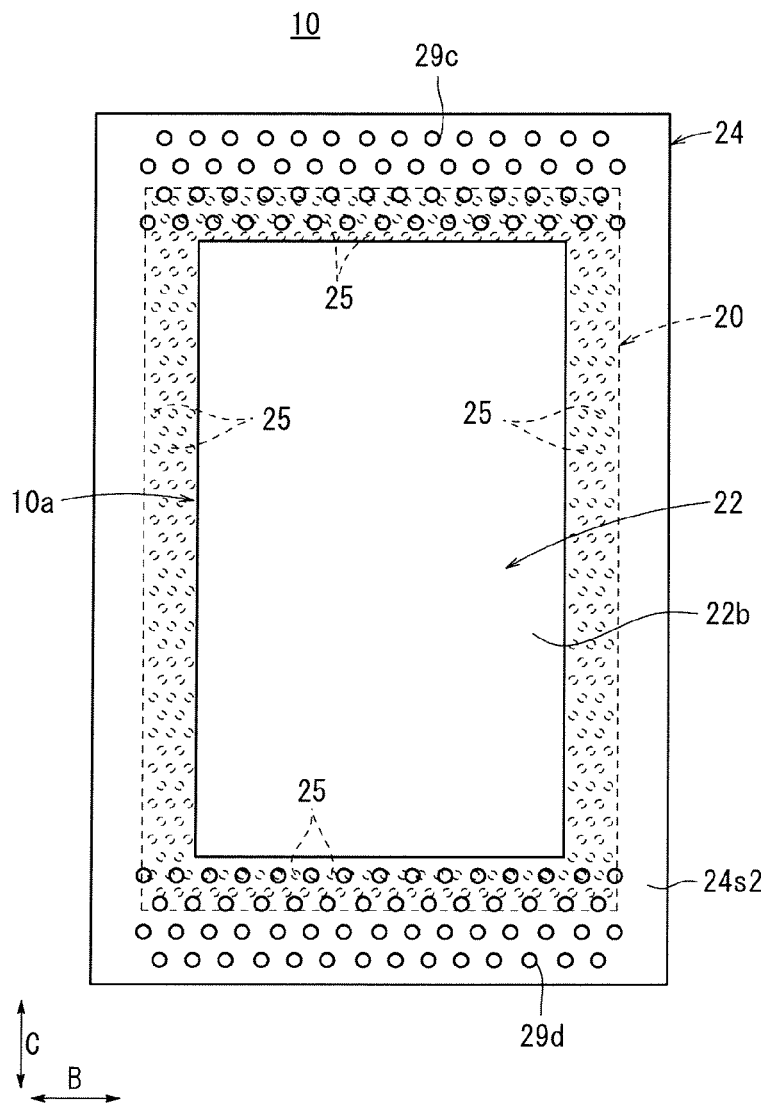
FIG. 4 is a view showing one surface of the resin frame equipped membrane electrode assembly.
Figure 5:
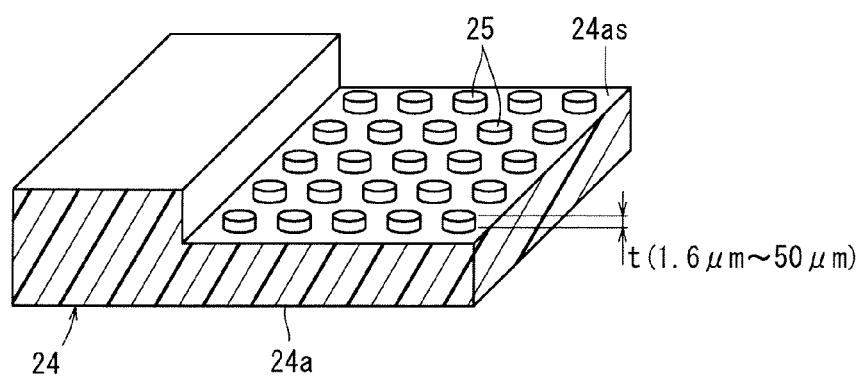
FIG. 5 is a partially enlarged perspective view showing a resin frame member of the resin frame equipped membrane electrode assembly.

As shown in FIGS. 3 to 5, the inner extension 24a of the resin frame member 24 includes uneven portions such as a plurality of columnar projections 25 formed integrally with an adhesive surface 24as where the adhesive layer 27 is provided. As shown in FIG. 5, each of the columnar projections 25 has a columnar shape having a diameter in a range of 5 μm to 50 μm, for example. The height t from the adhesive surface 24as of each columnar projection 25 is in a range of 1.6 μm to 50 μm.

If the height t of the columnar projection 25 is less than 1.6 μm, the adhesive force for joining the inner extension 24a of the resin frame member 24 to the outer end of the solid polymer electrolyte membrane 18 by adhesive is decreased, and the inner extension 24a of the resin frame member 24 can be peeled off easily from the outer end of the solid polymer electrolyte membrane 18. If the height t of the columnar projection 25 exceeds 50 μm, the solid polymer electrolyte membrane 18 is damaged mechanically.

Further, instead of the columnar projections 25, the uneven portions may have recesses and protrusions with a 10-point average roughness (surface roughness) Rz in a range of 1.6 μm to 50 μm.

As shown in FIGS. 2 and 3, the resin frame member 24 and the gas diffusion layer 20b of the anode 20 are combined together by a resin impregnated portion 28a, and the resin frame member 24 and the gas diffusion layer 22b of the cathode 22 are combined together by a resin impregnated portion 28b.

The resin impregnated portion 28a is formed in a frame shape over the entire periphery of the gas diffusion layer 20b, and the resin impregnated portion 28b is formed in a frame shape over the entire periphery of the gas diffusion layer 22b of the cathode 22. An inner end 28ae of the resin impregnated portion 28a is positioned outside from the outer end of the overlapped portion 26 overlapped in the stacking direction (see FIG. 3).

As shown in FIG. 1, an inlet buffer 29a corresponding to the inlet side of a fuel gas flow field 42 as described later is provided at an upper end in a surface 24s1 of the resin frame member 24 facing the anode 20. An outlet buffer 29b corresponding to the outlet side of the fuel gas flow field 42 is provided at a lower end in the surface 24s1 of the resin frame member 24. The inlet buffer 29a and the outlet buffer 29b are formed by a plurality of protrusions.

As shown in FIG. 4, an inlet buffer 29c corresponding to the inlet side of an oxygen-containing gas flow field 36 (described later) is provided at an upper end in a surface 24s2 of the resin frame member 24 facing the cathode 22. An outlet buffer 29d corresponding to the outlet side of the oxygen-containing gas flow field 36 is provided at a lower end in the surface 24s2 of the resin frame member 24. The inlet buffer 29c and the outlet buffer 29d are formed by a plurality of protrusions.

As shown in FIG. 1, at an upper end of the fuel cell 12 in a direction indicated by an arrow C (direction of gravity in FIG. 1), an oxygen-containing gas supply passage 30a for supplying an oxygen-containing gas, a coolant supply passage 32a for supplying a coolant, and a fuel gas supply passage 34a for supplying a fuel gas such as a hydrogen-containing gas are arranged in a horizontal direction indicated by an arrow B. The oxygen-containing gas supply passage 30a, the coolant supply passage 32a, and the fuel gas supply passage 34a extend through the fuel cell 12 in the stacking direction indicated by the arrow A.

At a lower end of the fuel cell 12 in the direction indicated by the arrow C, a fuel gas discharge passage 34b for discharging the fuel gas, a coolant discharge passage 32b for discharging the coolant, and an oxygen-containing gas dischare passage 30b for discharging the oxygen-containing gas are arranged in the direction indicated by the arrow B. The fuel gas discharge passage 34b, the coolant discharge passage 32b, and the oxygen-containing gas discharge passage 30b extend through the fuel cell 12 in the direction indicated by the arrow A.

The second separator 16 has the oxygen-containing gas flow field 36 on its surface 16a facing the resin frame equipped membrane electrode assembly 10. The oxygen-containing gas flow field 36 is connected to the oxygen-containing gas supply passage 30a and the oxygen-containing gas discharge passage 30b. A buffer area 38a is provided at the inlet (upper end) in the oxygen-containing gas flow field 36. The buffer area 38a contacts the inlet buffer 29c provided at the upper end of the surface 24s2 of the resin frame member 24. The buffer area 38a has a substantially flat surface. A plurality of inlet connection channels 40a extending from the oxygen-containing gas supply passage 30a are connected to one upper end of the buffer area 38a.

A buffer area 38b is provided at the outlet (lower end) of the oxygen-containing gas flow field 36. The buffer area 38b contacts the outlet buffer 29d provided at the lower end in the surface 24s2 of the resin frame member 24. A plurality of outlet connection channels 40b extending from the oxygen-containing gas discharge passage 30b are connected to one lower end of the buffer area 38b.

Figure 6:
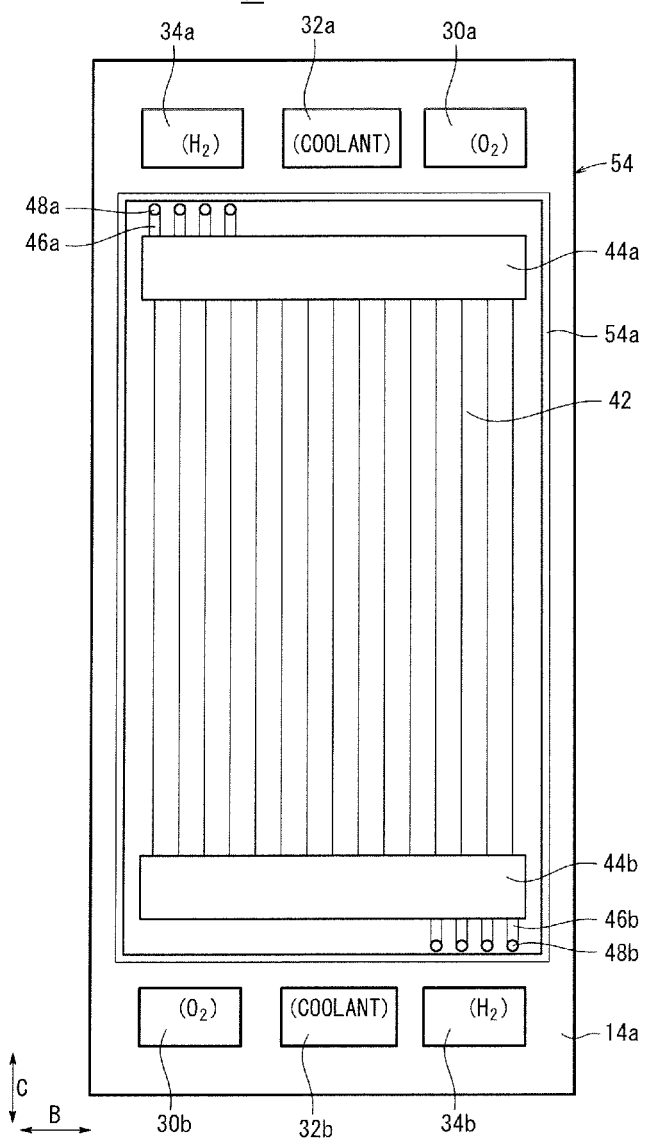
FIG. 6 is a front view showing a first separator of the fuel cell.

As shown in FIG. 6, the first separator 14 has the fuel gas flow field 42 on its surface 14a facing the resin frame equipped membrane electrode assembly 10. The fuel gas flow field 42 extends in the direction indicated by the arrow C.

A buffer area 44a is provided at the inlet (upper end) of the fuel gas flow field 42. The buffer area 44a contacts the inlet buffer 29a provided at the upper end in the surface 24s1 of the resin frame member 24. A plurality of inlet connection channels 46a are connected to an end of the buffer area 44a adjacent to the fuel gas supply passage 34a, and the inlet connection channels 46a are connected to a plurality of supply holes 48a.

A buffer area 44b is provided at the outlet (lower end) of the fuel gas flow field 42. The buffer area 44b contacts the outlet buffer 29b provided at the lower end in the surface 24s1 of the resin frame member 24. Discharge holes 48b are connected to an end of the buffer area 44b adjacent to the fuel gas discharge passage 34b through a plurality of outlet connection channels 46b.

As shown in FIG. 1, a plurality of inlet connection channels 50a connecting the supply holes 48a and the fuel gas supply passage 34a and a plurality of outlet connection channels 50b connecting the discharge holes 48b and the fuel gas discharge passage 34b are provided on a surface 14b of the first separator 14. Further, a coolant flow field 52 connecting the coolant supply passage 32a and the coolant discharge passage 32b are provided on the surface 14b of the first separator 14. The coolant flow field 52 extends in the direction indicated by the arrow C.

As shown in FIG. 2, an area of the gas diffusion layer 20b overlapped with the overlapped portion 26 in the stacking direction faces the fuel gas flow field 42.

As shown in FIGS. 1 and 2, a first seal member 54 is formed integrally with the surfaces 14a, 14b of the first separator 14, around the outer end of the first separator 14. A second seal member 56 is formed integrally with the surfaces 16a, 16b of the second separator 16, around the outer end of the second separator 16.

As shown in FIG. 2, the first seal member 54 includes a ridge seal 54a which contacts the second seal member 56, and the second seal member 56 includes a ridge seal 56a which contacts the resin frame member 24 of the resin frame equipped membrane electrode assembly 10. Each of the first seal member 54 and the second seal member 56 includes a thin planar seal.

Each of the first seal member 54 and the second seal members 56 is made of seal material, cushion material, or packing material such as an EPDM (ethylene propylene diene monomer) rubber, an NBR (nitrile butadiene rubber), a fluororubber, a silicone rubber, a fluorosilicone rubber, a Butyl rubber, a natural rubber, a styrene rubber, a chloroprene rubber, or an acrylic rubber.

Next, a method of producing the resin frame equipped membrane electrode assembly 10 will be described below.

Figure 7:
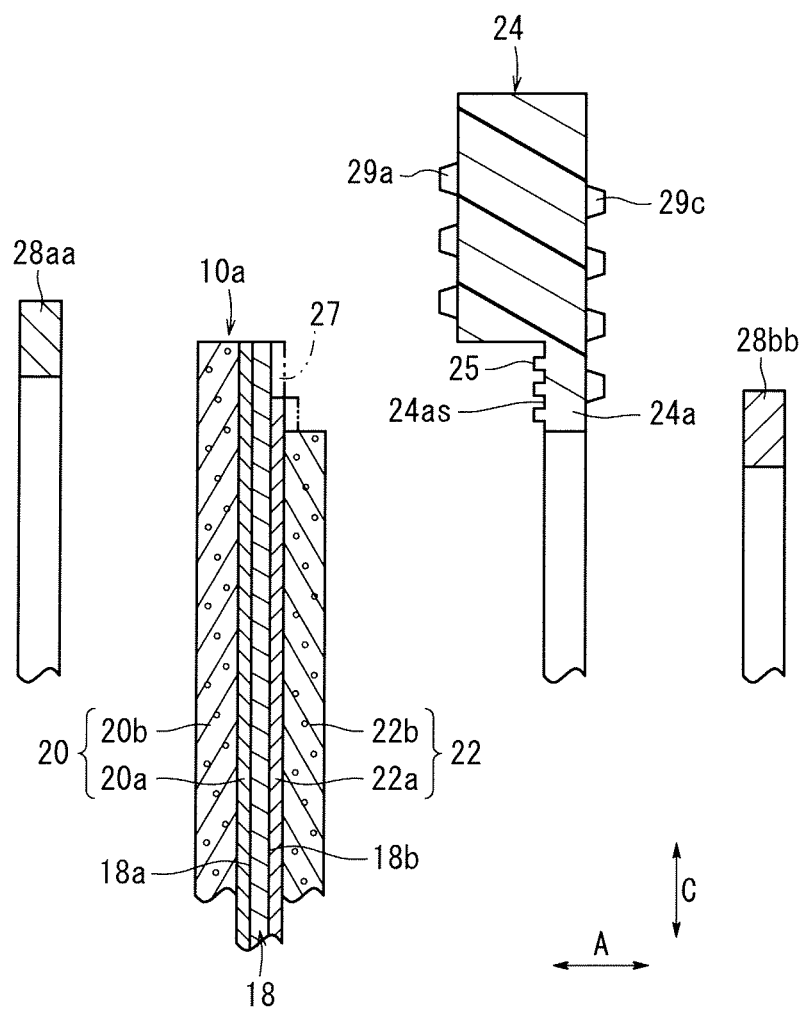
FIG. 7 is a cross sectional view showing a method of producing a resin frame equipped membrane electrode assembly.
Figure 8:
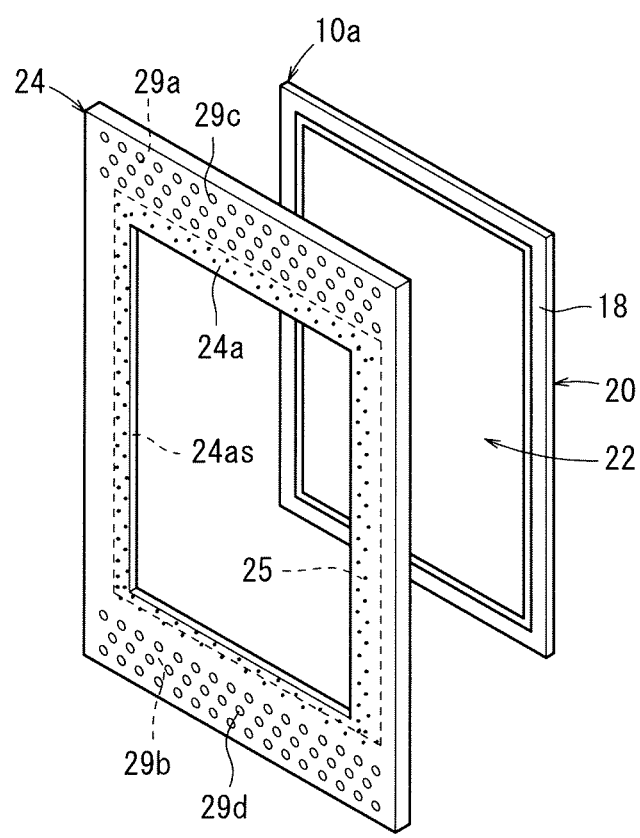
FIG. 8 is a perspective view showing a method of producing a resin frame equipped membrane electrode assembly.

Firstly, as shown in FIGS. 7 and 8, the membrane electrode assembly 10a of a stepped-type MEA is fabricated. Specifically, coating of the electrode catalyst layers 20a, 22a is applied to both surfaces 18a, 18b of the solid polymer electrolyte membrane 18. The gas diffusion layer 20b is provided above the surface 18a of the solid polymer electrolyte membrane 18, i.e., on the electrode catalyst layer 20a, and the gas diffusion layer 22b is provided above the surface 18b of the solid polymer electrolyte membrane 18, i.e., on the electrode catalyst layer 22a. These components are stacked together, and subjected to a hot pressing process to fabricate the membrane electrode assembly 10a.

The resin frame member 24 is formed by an injection molding machine (not shown) beforehand. As shown in FIG. 8, the resin frame member 24 is formed in a frame shape, and the resin frame member 24 includes the thin inner extension 24a. The inner extension 24a includes the plurality of columnar projections 25 formed integrally with the adhesive surface 24as. A plurality of protrusions are integrally formed on both surfaces of the resin frame member 24 and at both ends in the longitudinal direction to provide the inlet buffers 29a, 29c, and the outlet buffers 29b, 29d.

Then, as shown in FIG. 7, in the membrane electrode assembly 10a, the adhesive layer 27 is provided at each of the outer end of the solid polymer electrolyte membrane 18 and the outer end of the electrode catalyst layer 22a exposed to the outside from the outer periphery of the cathode 22. The resin frame member 24 is positioned aligning with the membrane electrode assembly 10a.

The inner extension 24a of the resin frame member 24 is provided at the cathode 22, the adhesive layer 27 is melted by heating (subjected to the hot melting process), and a load (e.g., pressure) is applied to the resin frame member 24. Thus, the inner extension 24a of the resin frame member 24 is adhered to the solid polymer electrolyte membrane 18. Further, at the anode 20, a resin member 28aa for forming the resin impregnated portion 28a is provided, and at the cathode 22, a resin member 28bb for forming the resin impregnated portion 28b is provided. Each of the resin members 28aa, 28bb has a frame shape, and is made of the same material as the resin frame member 24, for example.

In the state where the resin members 28aa, 28bb are provided in the membrane electrode assembly 10a and the resin frame member 24, and a load is applied to the resin members 28aa, 28bb, the resin members 28aa, 28bb are heated. As a heating method, for example, laser welding, infrared-ray welding, impulse welding or the like is adopted.

Thus, the resin members 28aa, 28bb are melted by heat, and the gas diffusion layer 20b of the anode 20 and the resin frame member 24 are impregnated with the melted resin of the resin member 28aa. Further, the gas diffusion layer 22b of the cathode 22 and the resin frame member 24 are impregnated with the melted resin of the resin member 28bb. In this manner, the resin frame equipped membrane electrode assembly 10 is produced.

The resin frame equipped membrane electrode assembly 10 is sandwiched between the first separator 14 and the second separator 16 to form the fuel cell 12. A predetermined number of the fuel cells 12 are stacked together to form a fuel cell stack, and a tightening load is applied to components between end plates (not shown).

Operation of the fuel cell 12 will be described below. Firstly, as shown in FIG. 1, an oxygen-containing gas is supplied to the oxygen-containing gas supply passage 30a, and a fuel gas such as a hydrogen containing gas is supplied to the fuel gas supply passage 34a. Further, a coolant such as pure water, ethylene glycol, or oil is supplied to the coolant supply passage 32a.

Thus, the oxygen-containing gas flows from the oxygen-containing gas supply passage 30a into the oxygen-containing gas flow field 36 of the second separator 16. The oxygen-containing gas moves in the direction indicated by the arrow C, and the oxygen-containing gas is supplied to the cathode 22 of the membrane electrode assembly 10a for inducing an electrochemical reaction at the cathode 22. In the meanwhile, the fuel gas from the fuel gas supply passage 34a flows through the supply holes 48a into the fuel gas flow field 42 of the first separator 14. The fuel gas moves in the direction indicated by the arrow C along the fuel gas flow field 42, and the fuel gas is supplied to the anode 20 of the membrane electrode assembly 10a for inducing an electrochemical reaction at the anode 20.

Thus, in each of the membrane electrode assemblies 10a, the oxygen-containing gas supplied to the cathode 22, and the fuel gas supplied to the anode 20 are partially consumed in the electrochemical reactions at catalyst layers of the cathode 22 and the anode 20 for generating electricity.

Then, the oxygen-containing gas partially consumed at the cathode 22 is discharged along the oxygen-containing gas discharge passage 30b in the direction indicated by the arrow A. Likewise, the fuel gas partially consumed at the anode 20 flows through the discharge holes 48b, and the fuel gas is discharged along the fuel gas discharge passage 34b in the direction indicated by the arrow A.

Further, the coolant supplied to the coolant supply passage 32a flows into the coolant flow field 52 between the first separator 14 and the second separator 16, and then, flows in the direction indicated by the arrow C. After the coolant cools the membrane electrode assembly 10a, the coolant is discharged from the coolant discharge passage 32b.

In the first embodiment, as shown in FIGS. 3 to 5, the inner extension 24a of the resin frame member 24 includes the columnar projections 25 as the uneven portions in the adhesive surface 24as which is adhered to the outer end of the solid polymer electrolyte membrane 18. In the structure, the inner extension 24a of the resin frame member 24 can be adhered to the outer end of the solid polymer electrolyte membrane 18 firmly and easily, and the desired strength of joining components of the entire resin frame equipped membrane electrode assembly 10 is reliably maintained.

In the first embodiment, as shown in FIGS. 2 and 3, the outer end 22ae of the electrode catalyst layer 22a of the cathode 22 protrudes outward beyond the outer end 22be of the gas diffusion layer 22b, and the inner extension 24a of the resin frame member 24 includes the overlapped portion 26 overlapped with the outer end 22ae of the electrode catalyst layer 22a in the stacking direction.

In the structure, even if the gap S1 is formed between the outer end 22be of the gas diffusion layer 22b and the inner end 24ae of the inner extension 24a of the resin frame member 24, the oxygen-containing gas does not contact the solid polymer electrolyte membrane 18 through the gap S1. Therefore, degradation at the end of the solid polymer electrolyte membrane 18 due to degradation by hydrogen peroxide produced by reaction of the oxygen-containing gas and the fuel gas or hydroxyl radical (.OH) produced using this hydrogen peroxide as a precursor is effectively and reliably suppressed.

Figure 9:
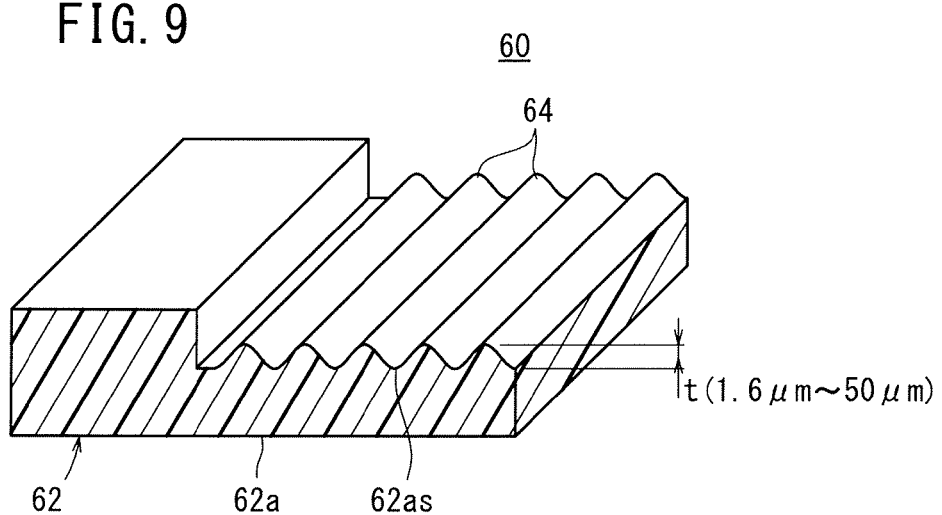
FIG. 9 is a partially enlarged perspective view showing a resin frame member of a resin frame equipped membrane electrode assembly according to a second embodiment of the present invention.

FIG. 9 is a partially enlarged perspective view showing a resin frame member 62 of a resin frame equipped membrane electrode assembly 60 according to a second embodiment of the present invention.

The resin frame member 62 includes an inner extension 62a, and the inner extension 62a has an adhesive surface 62as. Uneven portions such as a plurality of corrugated portions 64 are formed integrally with the adhesive surface 62as. The corrugated portions 64 are formed in parallel to each other, e.g., from the inner end to the outer end of the resin frame member 62. The distance (height of the corrugation) t between grooves and ridges of the corrugated portions 64 is in a range of 1.6 μm to 50 μm.

In the second embodiment, the inner extension 62a of the resin frame member 62 includes the corrugated portions 64 as the uneven portions in the adhesive surface 62as which is adhered to the outer end of the solid polymer electrolyte membrane 18. Thus, the same advantages as in the case of the first embodiment are obtained. For example, the inner extension 62a of the resin frame member 62 can be adhered to the outer end of the solid polymer electrolyte membrane 18 firmly and easily.

Figure 10:
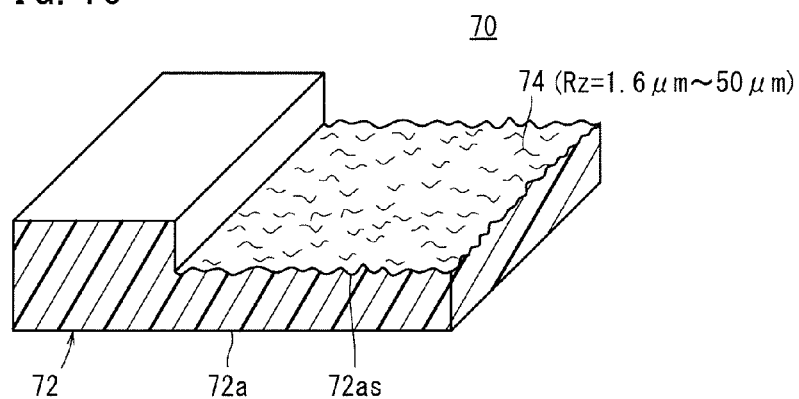
FIG. 10 is a partially enlarged perspective view showing a resin frame member of a resin frame equipped membrane electrode assembly according to a third embodiment of the present invention.

FIG. 10 is a partial enlarged perspective view showing a resin frame member 72 of a resin frame equipped membrane electrode assembly 70 according to a third embodiment of the present invention.

The resin frame member 72 includes an inner extension 72a, and the inner extension 72a has an adhesive surface 72as. Uneven portions such as recesses and protrusions 74 are provided randomly in the adhesive surface 72as. For example, the recesses and protrusions 74 are formed by shot blasting or abrasive blasting to have a 10-point average roughness Rz in a range of 1.6 μm to 50 μm.

In the third embodiment, the recesses and protrusions 74 are provided in the abrasive surface 72as, and the same advantages as in the cases of the first and second embodiments are obtained.

Figure 11:
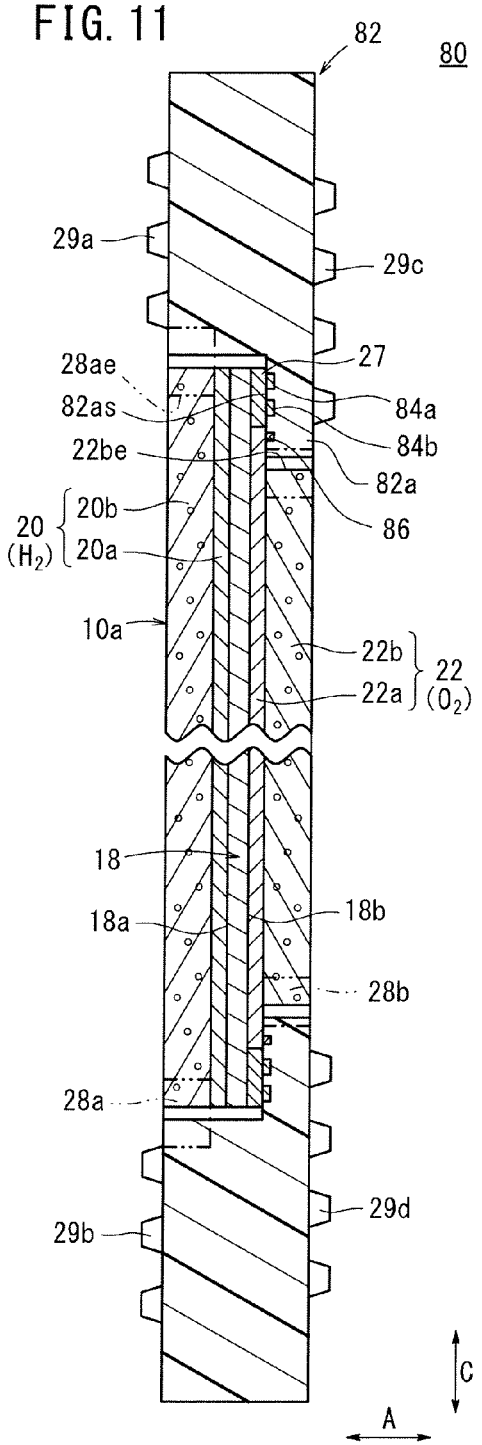
FIG. 11 is a cross sectional view showing main components of the resin frame equipped membrane electrode assembly according to a fourth embodiment of the present invention.

FIG. 11 is a cross sectional view showing main components of a resin frame equipped membrane electrode assembly 80 according to a fourth embodiment. The constituent elements that are identical to those of the resin frame equipped membrane electrode assembly 10 according to the first embodiment are labeled with the same reference numerals, and description thereof will be omitted.

The resin frame equipped membrane electrode assembly 80 includes a resin frame member 82 provided around the outer end of the solid polymer electrolyte membrane 18, and joined to the anode 20 and the cathode 22. The resin frame member 82 is made of the same material as the resin frame member 24, and includes an inner extension 82a protruding toward the outer periphery of the cathode 22 to contact the outer end of the solid polymer electrolyte membrane 18.

Figure 12:
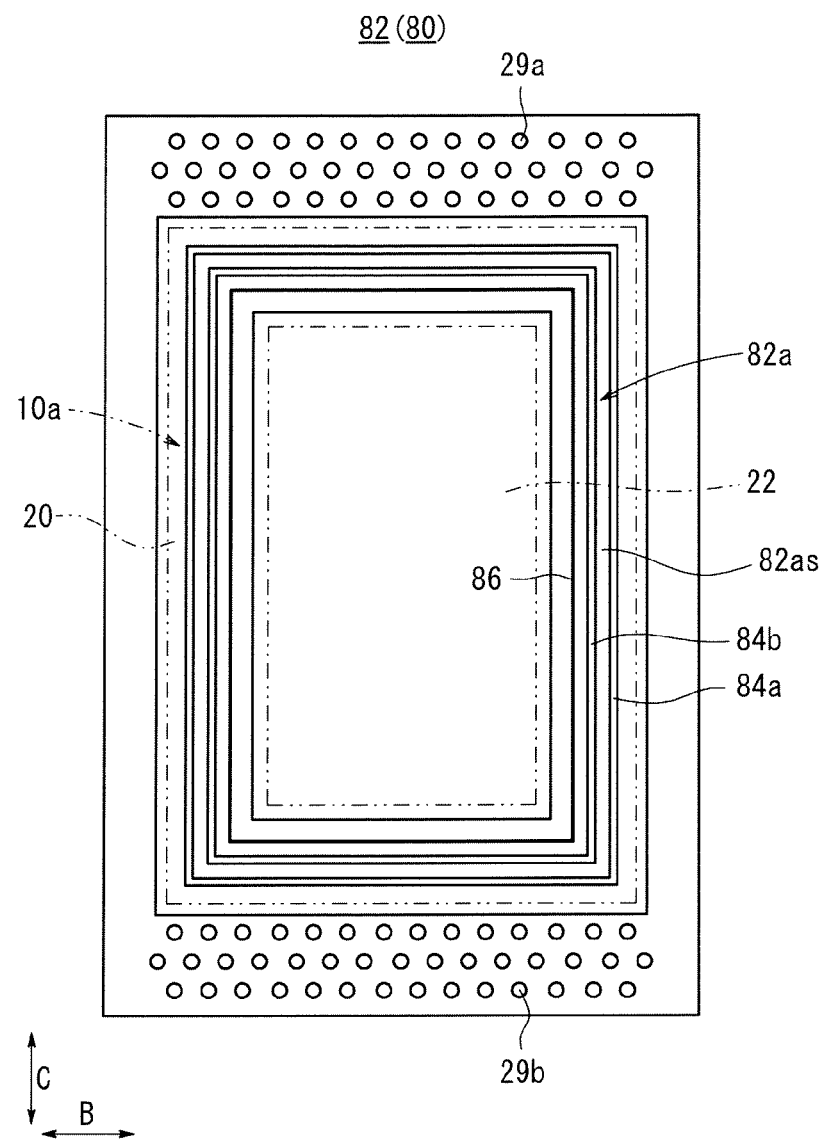
FIG. 12 is a front view showing a resin frame member of the resin frame equipped membrane electrode assembly.
Figure 13:
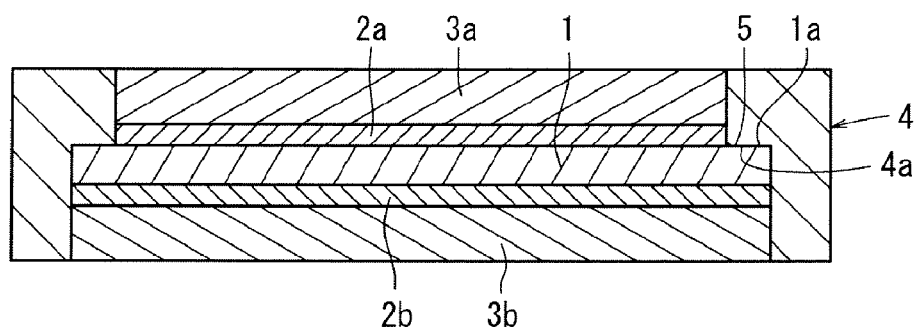
FIG. 13 is an explanatory view showing a membrane electrode assembly disclosed in conventional technique.

The inner extension 82a has an abrasive surface 82as where the adhesive layer 27 is provided. As shown in FIGS. 11 and 12, at least one, e.g., two grooves 84a, 84b are provided around the outer end of the solid polymer electrolyte membrane 18. The grooves 84a, 84b have a predetermined width and a predetermined depth, and arranged in a form of dual frames oriented inward of the inner extension 82a. The grooves 84a, 84b may not be in the form of dual frames, and may be in the form of three or more frames.

At the inner end of the inner extension 82a, a reference groove 86 is formed inside the groove 84b of the inner extension 82a. The reference groove 86 is narrower than the grooves 84a, 84b, and faces the electrode catalyst layer 22a. For example, the reference groove 86 functions as a reference position for applying adhesive. Adhesive may be applied to the reference groove 86.

In the fourth embodiment, preferably, the surface roughness Rz of the adhesive surface 82as is smaller than the groove depth. The grooves 84a, 84b are formed in the adhesive surface 82as. Thus, when the adhesive layer 27 is provided in the grooves 84a, 84b, the grooves 84a, 84b are reliably filled with the adhesive.

Therefore, the desired adhesive force of the adhesive layer 27 is maintained, and the inner extension 82a of the resin frame member 82 can be adhered to the outer end of the solid polymer electrolyte membrane 18 easily and firmly. Accordingly, the same advantages as in the case of the first to third embodiments are obtained. For example, the desired strength of joining components of the entire resin frame equipped membrane electrode assembly 80 is maintained reliably.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell resin frame equipped membrane electrode assembly comprising:

a membrane electrode assembly including a solid polymer electrolyte membrane, a first electrode provided on one surface of the solid polymer electrolyte membrane, and a second electrode provided on another surface of the solid polymer electrolyte membrane, the first electrode including a first catalyst layer and a first diffusion layer, the second electrode including a second catalyst layer and a second diffusion layer having an outer end, the first electrode having a surface size larger than that of the second electrode; and a resin frame member provided around the solid polymer electrolyte membrane, wherein the resin frame member includes an inner extension having an inner end, said inner extension protruding toward an outer periphery of the second electrode, and adhered to an outer end of the solid polymer electrolyte membrane and a gap is formed between the inner end of the inner extension and the outer end of the second diffusion layer;

uneven portions are provided in an adhesive surface of the inner extension;

an adhesive layer disposed between a periphery of an outer end of the solid polymer electrolyte membrane and the inner extension of the resin frame, to adhere the adhesive surface of the inner extension to the outer end of the solid polymer electrolyte membrane; and the inner extension includes an overlapped portion overlapped with an outer end of the second catalyst layer, the overlapped portion extending parallel to the one surface and to the another surface of the solid polymer electrolyte membrane.

2. A fuel cell resin frame equipped membrane electrode assembly comprising:

a membrane electrode assembly including a solid polymer electrolyte membrane, a first electrode provided on one surface of the solid polymer electrolyte membrane, and a second electrode provided on another surface of the solid polymer electrolyte membrane, the first electrode including a first catalyst layer and a first diffusion layer, the second electrode including a second catalyst layer and a second diffusion layer having an outer end, the first electrode having a surface size larger than that of the second electrode; and a resin frame member provided around the solid polymer electrolyte membrane, wherein the resin frame member includes an inner extension, having an inner end, said inner extension protruding toward an outer periphery of the second electrode, and adhered to an outer end of the solid polymer electrolyte membrane and a gap is formed between the inner end of the inner extension and the outer end of the second diffusion layer;

uneven portions having a 10-point average roughness Rz in a range of 1.6 μm to 50 μm are randomly provided in an adhesive surface of the inner extension;

an adhesive layer is disposed between a periphery of an outer end of the solid polymer electrolyte membrane and the inner extension of the resin frame, to adhere the adhesive surface of the inner extension to the outer end of the solid polymer electrolyte membrane; and the inner extension includes an overlapped portion overlapped with the outer end of the second catalyst layer, the overlapped portion extending parallel to the one surface and to the another surface of the solid polymer electrolyte membrane.

3. A fuel cell resin frame equipped membrane electrode assembly according to claim 1, wherein the resin frame member includes a thick portion thicker than another portion of the resin frame member.

4. A fuel cell resin frame equipped membrane electrode assembly according to claim 1, wherein one of the first diffusion layer and the second diffusion layer has a resin impregnated portion combined to the resin frame member.

5. A fuel cell resin frame equipped membrane electrode assembly according to claim 1 wherein the resin frame member includes a buffer connecting a reactant gas passage to a reactant gas flow field.

* * * * *